United States Patent [19]
Domurat

[11] Patent Number: 5,526,942
[45] Date of Patent: Jun. 18, 1996

[54] MULTIPLE ORIENTATION FLORAL STAND

[76] Inventor: Kevin X. Domurat, 4135 Dixie Canyon Ave., Sherman Oaks, Calif. 91423

[21] Appl. No.: 402,737

[22] Filed: Mar. 13, 1995

Related U.S. Application Data

[63] Continuation of Ser. No. 216,153, Mar. 22, 1994, abandoned, which is a continuation-in-part of Ser. No. 11,806, Feb. 1, 1993, Pat. No. 5,301,463.

[51] Int. Cl.$^6$ ....................................................... A01G 5/00
[52] U.S. Cl. ........................ 211/60.1; 47/41.01; 211/89; 248/316.2; 248/309.1
[58] Field of Search ................. 47/41.01, 41.11, 47/41.12, 41.13, 41.15; 211/60.1, 89; 248/316.2, 309.1

[56] References Cited

U.S. PATENT DOCUMENTS

| | | | |
|---|---|---|---|
| 427,402 | 5/1890 | Christie . | |
| 720,132 | 2/1903 | Green . | |
| 1,314,625 | 9/1919 | Wedin | 211/89 |
| 2,121,307 | 6/1938 | Swift | 211/89 |
| 2,218,157 | 10/1940 | Seidel | 47/41.11 |
| 2,226,950 | 12/1940 | Simpson | 47/41.13 |
| 2,486,848 | 11/1949 | Huck | 47/41.01 |
| 2,728,964 | 1/1956 | Baird | 47/41.13 |
| 2,747,333 | 5/1956 | Erbguth . | |
| 2,774,481 | 12/1956 | Sievers | 211/89 |
| 2,779,459 | 1/1957 | Waterman | 47/41.13 |
| 2,904,932 | 9/1959 | Seewann . | |
| 2,908,398 | 10/1959 | Snyder | 211/89 |
| 3,157,558 | 11/1964 | Adler | 47/41.01 |
| 3,733,746 | 5/1973 | Allen | 47/41.01 |
| 4,101,517 | 3/1977 | Kapstand | 211/89 |
| 4,165,835 | 8/1979 | Dearing . | |
| 4,958,461 | 9/1990 | Aldrich . | |

FOREIGN PATENT DOCUMENTS

| | | | |
|---|---|---|---|
| 156466 | 11/1907 | Austria | 47/41.15 |
| 675340 | 1/1966 | Belgium | 211/89 |
| 47680 | 8/1933 | Denmark . | |
| 758427 | 1/1934 | France . | |
| 808385 | 2/1937 | France . | |
| 2373258 | 8/1978 | France . | |
| 280851 | 12/1913 | Germany . | |
| 1529393 | 9/1969 | Germany | 47/41.15 |
| 9114 | of 1891 | United Kingdom | 47/41.11 |
| 18701 | of 1898 | United Kingdom . | |
| 17699 | of 1898 | United Kingdom | 47/41.11 |
| 23881 | of 1911 | United Kingdom . | |
| 846794 | 8/1960 | United Kingdom . | |
| 2191692 | 12/1987 | United Kingdom . | |

*Primary Examiner*—Henry E. Raduazo
*Attorney, Agent, or Firm*—Blakely, Sokoloff, Taylor & Zafman

[57] ABSTRACT

A floral stand designed to display flora in any desired orientation, including horizontally or upside down. The stand is constructed to secure flora requiring nutrient fluids and dried flora. When the storage of fluid is required, the stand comprises a reservoir portion having a plurality of walls in which one of these walls includes a precut aperture. A securing device, such as a grommet, is inserted through said precut aperture of said first wall in order to hermetically seal the reservoir portion by static or vacuum pressure. The securing device includes a perforation hole small enough to prevent leakage of fluid from the reservoir portion.

With respect to dried flora, the floral stand includes at least one spring clip made of thin, flexible material in order to secure the flora stem between the spring clip and a face of the stand or alternatively, to secure the flora stem between multiple spring clips if present and directly opposite one another.

15 Claims, 6 Drawing Sheets

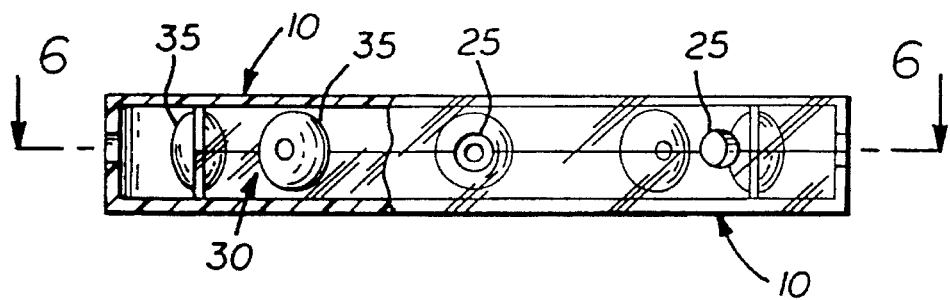
FIG. 5
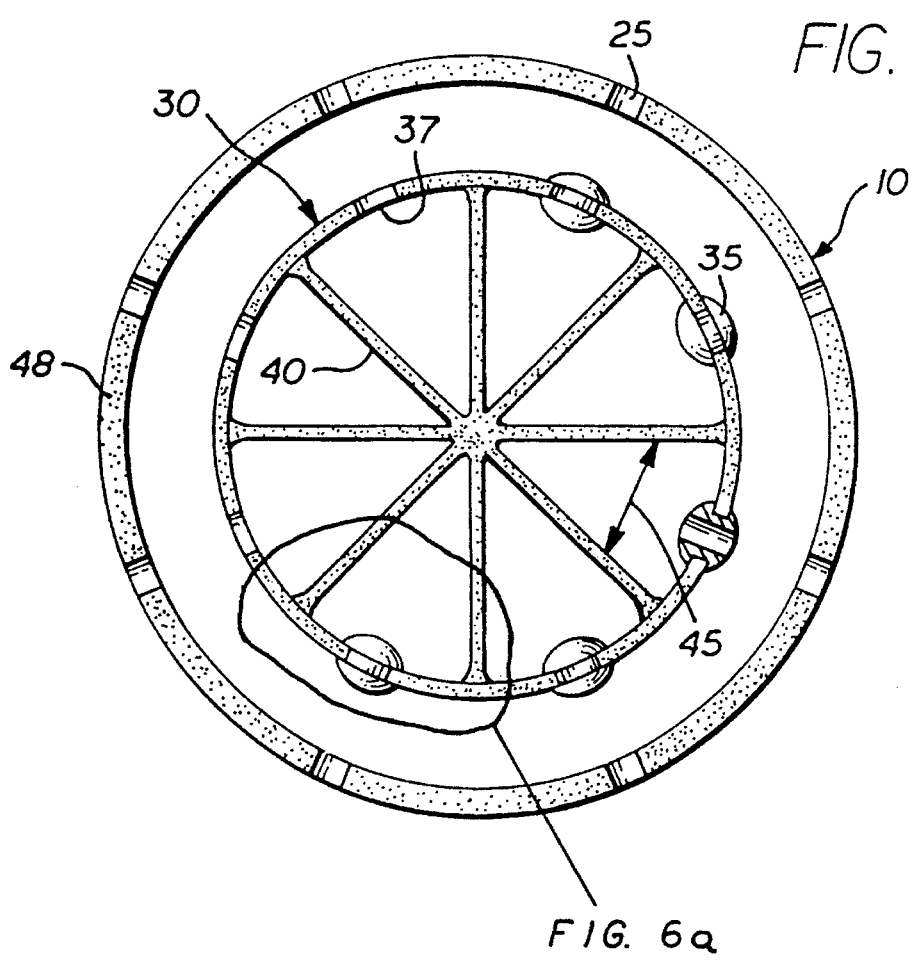
FIG. 6
FIG. 6a

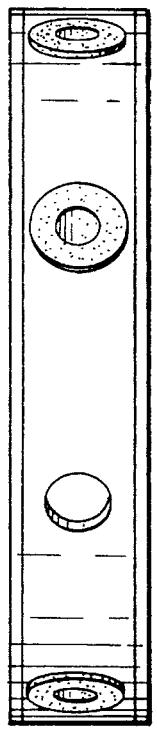
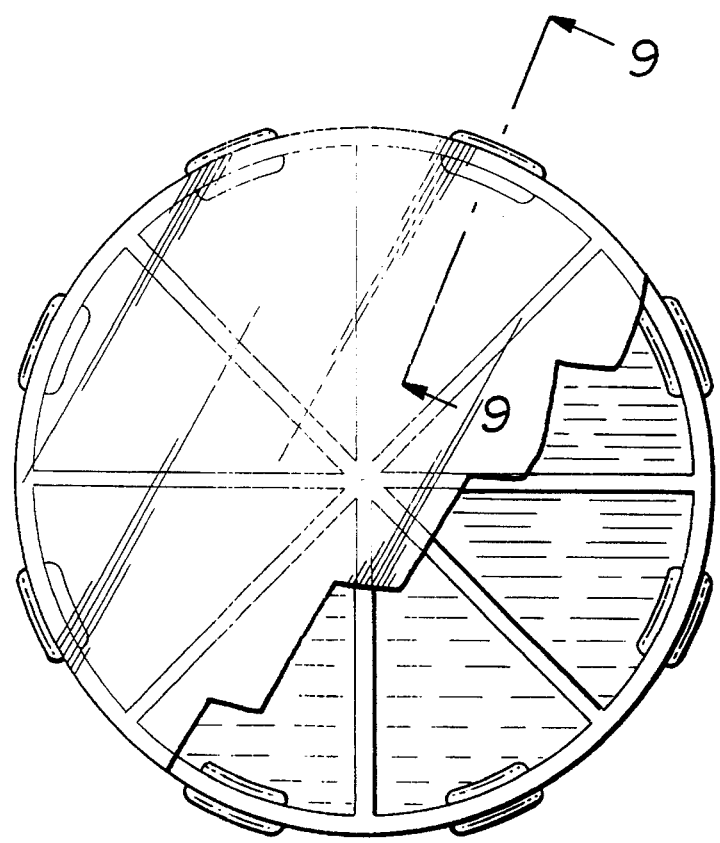
FIG. 8  FIG. 7
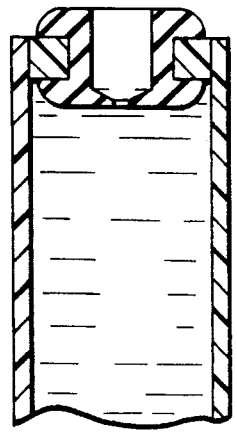
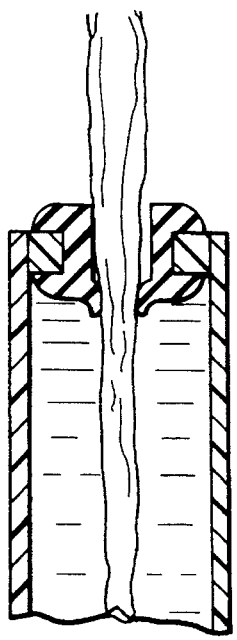
FIG. 9  FIG. 10

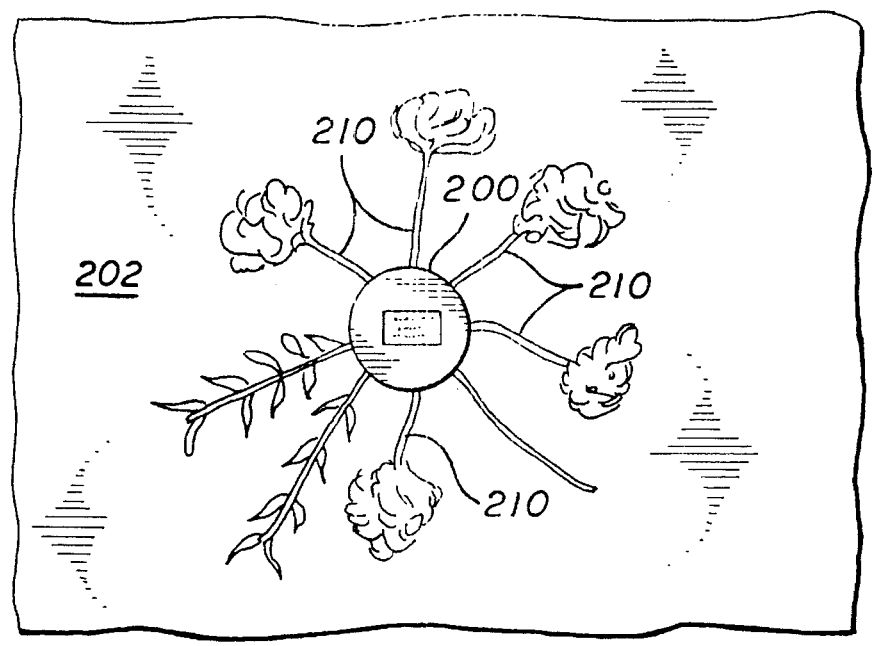
FIG. 11
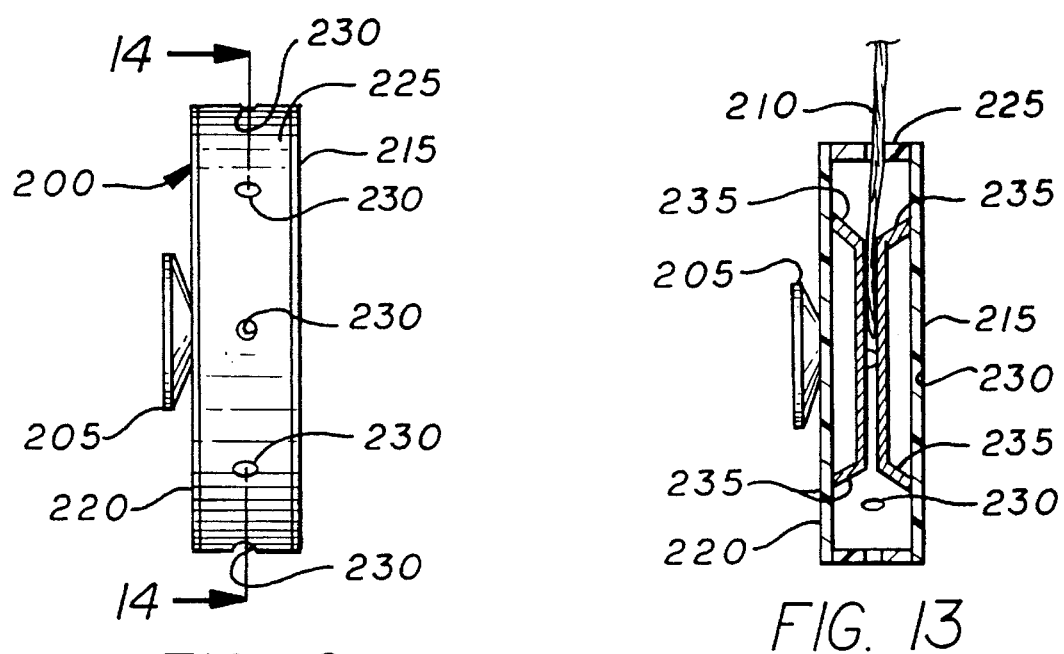
FIG. 12
FIG. 13

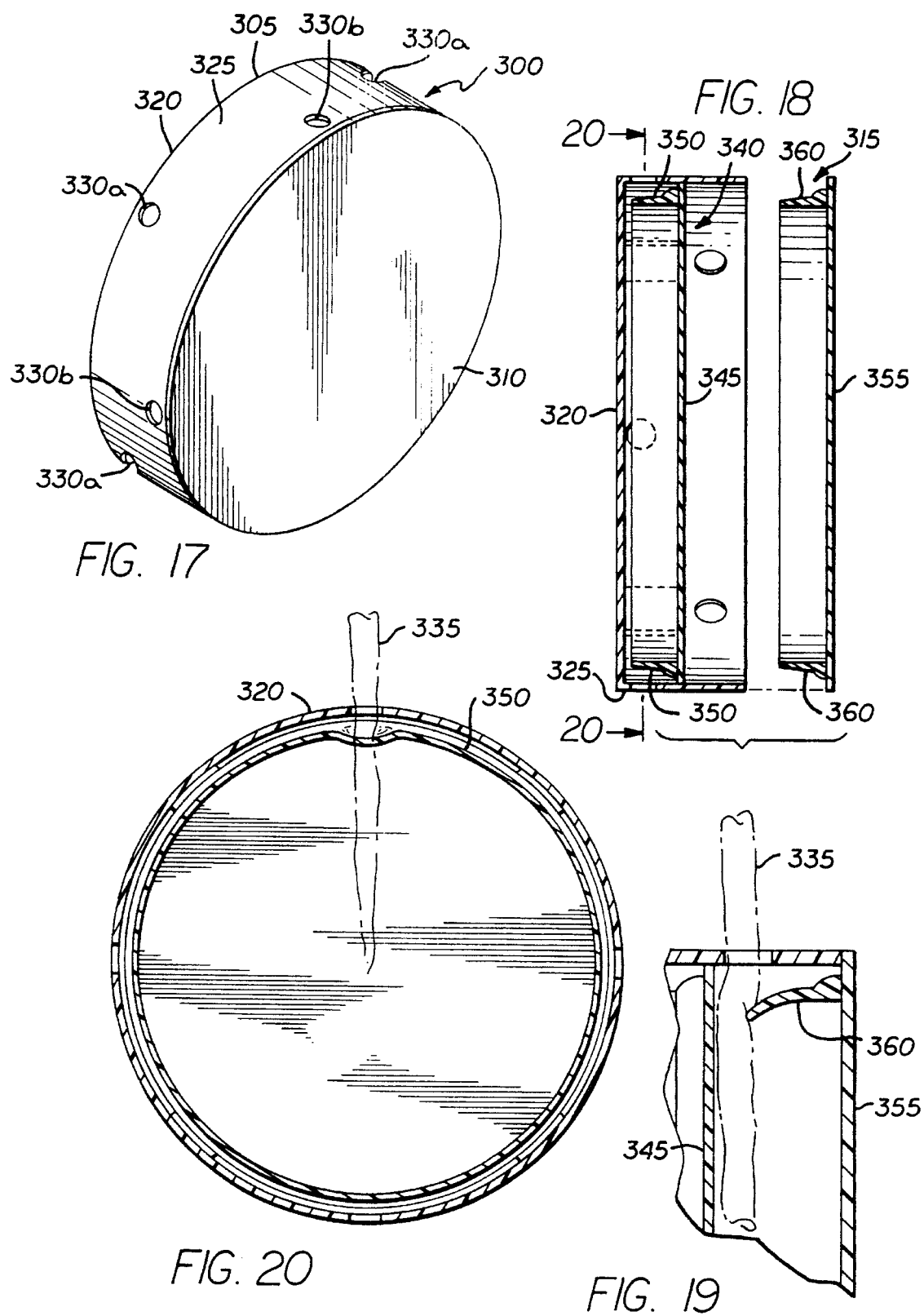

MULTIPLE ORIENTATION FLORAL STAND

RELATED CASES

This is a continuation of a continuation-in-part application (Ser. No. 08/216,153) filed on Mar. 22, 1994 and now abandoned, based on a U.S. patent application entitled "Multiple Orientation Floral Stand" (Ser. No. 08/011,806) issued as U.S. Pat. No. 5,301,463.

BACKGROUND OF THE INVENTION

1. Field of the Invention

The present invention relates to a floral holding device. More specifically, the present invention relates to a device used to fixedly secure a stem or branch of any plant in any desirable orientation.

2. Background of the Invention

For many years, flowers, plants and the like (hereinafter referred to as "flora") were primarily displayed in a vase which has a limited number of display orientations. For example, the stems or branches of the flora were permitted to protrude at slight angles from a center axis of the vase. However, these flora were unable to be arranged to hang upside down or against a wall or window.

In efforts to overcome these arrangement limitations, a first multiple orientation flower stand was configured to be affixed to walls, windows or even ceilings, to allow flora arrangements projecting in a conventional upward manner as well as downwards and sideways as disclosed and claimed in U.S. Pat. No. 5,195,270 entitled "Floral Stand" to Kevin X. Domurat, the named inventor and Applicant of the present Application. The first stand utilized an outer shell and an inner core to hold the flora as well as provide such flora with nutrient fluid. Such nutrient fluid was retained in two layers of porous material disposed on both sides of a stem or branch of the flora inserted into the first stand. A spring clip was incorporated within the first stand to hold these flora stems or branches in place, particularly when the flora are oriented in an upside-down manner. However, one problem associated with first stand is that these two layers of porous material had a tendency of quickly evaporating, thereby generally failing to provide a requisite amount of nutrient fluid unless constantly monitored. In addition, it was difficult to replenish such layers of porous material with fluid.

Thus, an improved version of the first stand was invented which is disclosed and claimed in above-identified pending U.S. patent application (Ser. No. 08/011,806). In that application, a multiple orientation flower stand (referred to hereinafter as the "second stand") comprises a shell covering an inner portion including a plurality of hermetically sealed (i.e., air-tight) compartments, each of these compartments including a hole precut into an outer wall of the compartment to accommodate a grommet. The shell includes a plurality of cut holes aligned with the grommets of the inner portion and of sufficient diameter to allow a stem of a flower or branch to be inserted therethrough. As a result, it is still extremely difficult to replenish nutrient fluids (e.g., water) and other nutrients in the compartments of the inner portion, requiring an eye dropper or narrow tube to be inserted through the cut holes of the shell and the grommets. In addition, that second stand is incapable of allowing the grommets to be replaced if any of them becomes defective.

In addition, although each of the above-indicated stands could support flora and items which did not require nutrient fluids (i.e., "dried flora"), such as, for example, dried flowers, plastic flowers and the like, it is contemplated that an improved version of the stand for dried flora is preferable.

SUMMARY AND OBJECTS OF THE INVENTION

The apparatus is discussed which overcome the disadvantages and limitations associated with Applicant's multiple orientation floral stands permitting flora to be displayed in any desired location and in any desired orientation.

It is an object of the present invention to provide a simple apparatus permitting flora requiring nutrient fluids to be displayed in a variety of orientations, whether vertically with the flora upside-down or conventionally displayed.

It is another object of the present invention to provide an apparatus which permits easy addition of nutrient fluids.

It is yet another object of the present invention to provide an apparatus which permits flora and items requiring no nutrient fluids to be displayed in a variety of orientations.

It is a further object of the present invention to provide a cost-effective apparatus for securing flora in a chosen orientation.

These and other objects of the present invention are provided in a multiple orientation floral stand comprising a reservoir portion having multiple walls such that a first wall includes a precut aperture in which a grommet is inserted therein so as to hermetically sealed the reservoir through static and vacuum pressure. The grommet includes a perforation hole to allow floral stems to be inserted therethrough, but the hole is small enough to prevent leakage of fluid from said reservoir when said stand is oriented in a manner which normally induces fluid flow.

Another embodiment of the floral stand is directed toward dried flora but is capable of securing flora requiring nutrient fluids as well. This stand comprises a hollow shell shaped in any pleasing configuration, a spring clip coupled to the shell and a device for affixing the shell to a surface such as a wall, window and the like. The spring clip, located within the shell, secures a stem of the flora inserted into the hollow shell through an opening or a precut aperture. Alternatively, a pair of spring clips directly opposing on another could be implemented in which the flora stem is secured between the spring clips.

Yet another embodiment of the floral stand directed toward dried flora includes a stand comprising a first, second and third shell members. The first shell member includes a first circular face coupled to a circumferential edge portion having a plurality of precut apertures in a staggered orientation in order to produce foreground apertures and background apertures. The second shell member including a second circular face having a diameter less than a diameter of the circumferential edge portion and a first spring clip coupled to the second circular face. The second shell member is inserted spring clip first through the circumferential edge portion to rest against the first circular face so that the flora stem of the flora inserted through one of the foreground apertures is secured by the first spring clip and the first circular face. Finally, the third shell member includes a third circular face and a second spring clip, the third shell member being identical to the second shell member, except that the third circular face has a diameter approximately equal to a diameter of the circumferential edge portion. The third circular face is affixed to the circumferential edge portion to seal the floral stand.

BRIEF DESCRIPTION OF THE DRAWINGS

The objects of the present invention will be described with respect to the following figures in which:

FIG. 5 is a partially cutaway side elevation view of the second stand, particularly showing the division of the stand in identical halves and the grommets located in place on the inner ring.

FIG. 6 is a view of half of the embodiment of the second stand, taken along line 6—6 of FIG. 5.

FIG. 7 is a peel-away plan view of an embodiment of the present invention, particularly showing a plurality of hermetically sealed compartments within the disk.

FIG. 8 is a partially cutaway side elevation view of the embodiment of the present invention, particularly showing the division of the present invention in identical halves and the positioning of the grommets.

FIG. 9 is a sectional view of the grommet bordering a compartment according to line 7—7.

FIG. 10 is a sectional view of the grommet in which a flora stem or branch is inserted through a grommet into a particular compartment.

FIG. 11 is a front view of a second embodiment of the present invention attached to a glass window illustrating how flora may be displayed upside down.

FIG. 12 is a side elevation view of the second embodiment of the present invention.

FIG. 13 is a cutaway side elevation view of the second embodiment taken along lines 13—13 of FIG. 14.

FIG. 17 is a perspective view of a third embodiment of the present invention.

FIG. 18 is a cut-away side elevation view of the third embodiment of the present invention.

FIG. 19 is an exploded view of FIG. 18 in which a flora stem is inserted through a background aperture.

FIG. 20 is a cutaway plan view of the third embodiment taken along lines 20—20 of FIG. 18.

DETAILED DESCRIPTION OF THE INVENTION

A multiple orientation floral stand for displaying flora requiring nutrient fluid and dried flora is described in detail. More particularly, the present invention might best be described as a floral stand which secures a stem or branch of flora so that the flora can be displayed in any desired orientation. The floral stand comprises numerous embodiments for those flora arrangements requiring nutrient fluid and those arrangements directed toward dried flora, although neither is mutually exclusive of the other.

Figure 1:
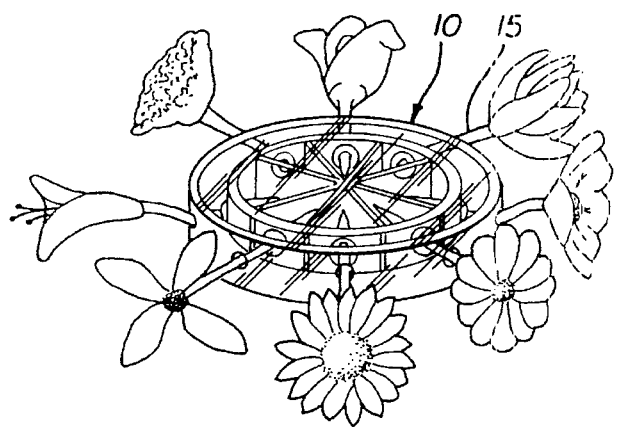
FIG. 1 is a perspective view of the embodiment of the second stand, particularly showing how flowers and other flora may be displayed.

Referring to FIGS. 1–6, the second stand disclosed and claimed in U.S. Pat. No. 5,301,463 is illustrated. As shown in FIG. 1, a preferred embodiment of the second stand, made of transparent or opaque polystyrene plastic, includes a circular disk shaped hollow shell 10, with flora stems 15 inserted in the shell 10 through holes in its circumferential edge. As can be seen in FIG. 1, each flora stem 15 is inserted into a separate compartment which serves as a liquid reservoir. These compartments have been filled with nutrient fluids prior to insertion of the flora stems 15.

Figure 2:
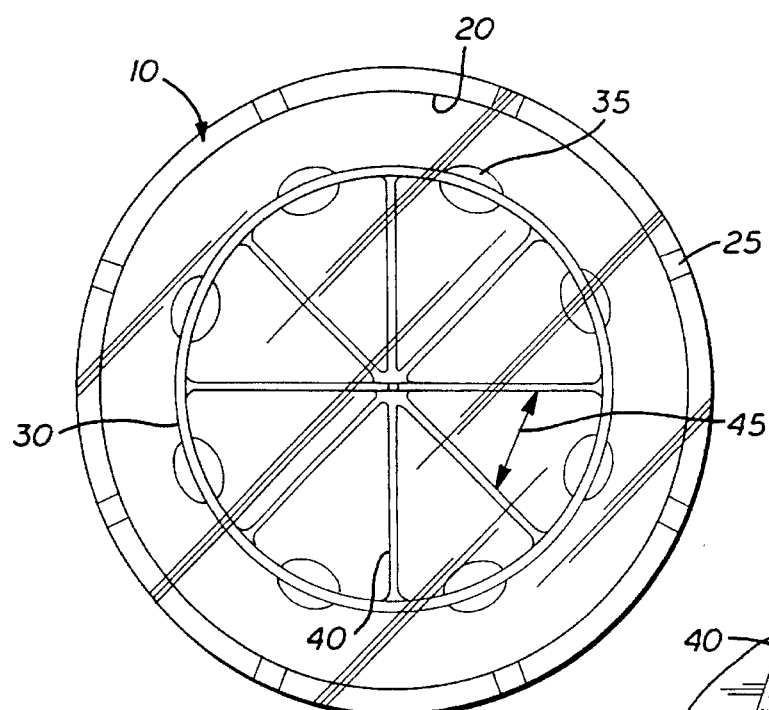
FIG. 2 is a plan view of the embodiment of the second stand, particularly showing through the watering means compartments through a transparent top.
Figure 6A:
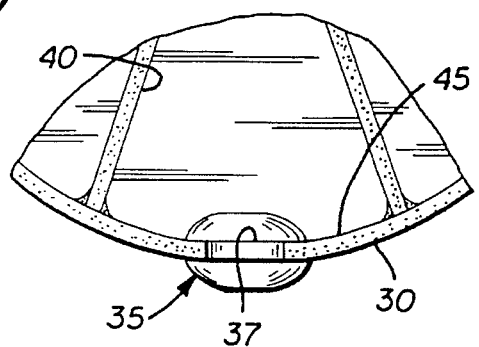
FIG. 6a is a partial view of the inner ring portion of the embodiment, useful in showing detail of the attachment of the grommets to the inner portion.

Illustrated in FIG. 2, the second stand comprises a plastic hollow shell 10 completely enclosing an internal portion 30 watering means comprising a plastic outer wall enclosing a multiple number of liquid reservoirs 45 formed by dividers 40. The internal portion 30 walls and dividers are formed molded to the shell 10, making them air-tight and leaving a substantial space between an inner surface 20 of the shell 10 and the wall surrounding the internal portion 30 watering means. Located spaced around the external surface of the shell 10 are holes 25 sized for the insertion of the flora stems 15. In the case of the circular disk configuration shown in FIGS. 1 and 2, the stem holes 25 are located around a circumferential side surface perpendicular to the flat, circular top and bottom shell surfaces. The stem holes 25 are located, each radially in line with the center of a liquid reservoir 45 in the internal portion.

On the outer wall of each reservoir 45 is formed or cut a hole 37 which is sized to accommodate a special grommet 35. Each grommet hole 37 is located in line with the stem hole 25 in the shell 10 corresponding to a given liquid reservoir 45. The reservoir 45 outer wall immediately around the grommet hole 37 is flattened to ensure proper seating of the grommet 35 and sealing. This aspect is shown in the detail drawing of FIG. 6a.

Since the preferred embodiment configuration is disk shaped, the entire disk shell 10 is split horizontally on its thickness into two identical halves indicated by plane 6—6 in FIG. 5. This enables placing the grommets 35 in each grommet hole 37 before assembling the second stand.

Figure 3:
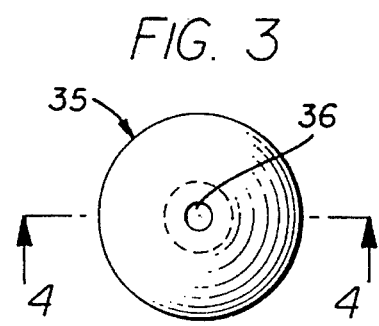
FIG. 3 is a top view of a grommet used in the second stand to retain the flora stems and branches.
Figure 4:
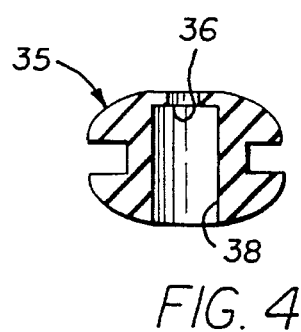
FIG. 4 is a cutaway side elevation view of the grommet taken along line 4—4 of FIG. 3.

A special grommet 35 is illustrated in FIGS. 3 and 4. As shown, it is circular 'button' shaped as a conventional grommet and is plastic. However, its central axis bore 38 terminates at one surface, termed the upper or outer surface, with a thin wall or membrane. The center of this upper surface membrane is pierced with a small hole or perforation 36, shown in exaggerated size for clarity in FIGS. 3 and 4. The perforation 36 in the grommet membrane allows the grommet membrane to stretch, permitting insertion of a flower stem or branch and gripping the stem tightly once it is inserted in the reservoir 45.

The two halves of the shell are assembled and adhered together using a suitable plastic glue 48 on all the open edges of the shell and inner portion walls. Thus, the assembled floral stand will have a completely airtight internal portion containing reservoirs 45, except for the perforations in the grommets. The stand is then prepared for use by filling the liquid reservoirs 45 with nutrient fluid, and adding adhesive or a hanger to one outside surface or edge of the stand for use in hanging the floral stand.

Filling the reservoirs with fluid can best be done by using a dropper which can be inserted in the stem holes 25 of the shell 10 and pushed through the perforation 36 in the grommet sealing each reservoir. The fluid is forced into the reservoir by pressure applied by the dropper bulb. At the same time, most of the air in the reservoir is displaced by the fluid, being partly absorbed by the fluid and partly expelled around grommet to the outside.

In a possible variation of the design, a central hole in the second stand that communicates with each of the reservoirs may be incorporated. The central hole could then be used for filling all the reservoirs at the same time. An airtight cap would cover the hole entry when the second stand was not being filled. This represents an alternate approach to filling the reservoirs through the grommets.

Testing has been performed to demonstrate that the reservoirs will not leak fluid out through the grommets in any orientation, including vertical. This is because fluid leaving the airtight reservoir, even under gravitational force, encounters a strong fluid skin tension at the grommet perforation and a greater outside pressure. This is quite sufficient to overcome gravitational force. The demonstrations have been performed both with and without flower stems inserted in the grommets.

It has also been demonstrated that even sharp movements or sudden accelerations such as dropping on the floor will not cause any substantial leakage, although some slight leakage may occur around the stem of any flower which is upside down during a sudden acceleration. In normal handling, however no leakage will occur.

Referring now to FIGS. 7–10, an embodiment of a multiple orientation floral stand 100 (the "floral stand") of the present invention is illustrated. In FIG. 7, the floral stand 100, made of transparent or opaque polystyrene plastic material, comprises a generally circular disk 105 enclosing a plurality of compartments 110 formed by a corresponding plurality of dividers 115. The compartments 110, which are hermetically sealed by these dividers 115, act as a reservoir for fluids providing nutrients to the flora. The present invention is identical to the second stand as shown in FIG. 1–6, except that the floral stand 100 does not include the shell.

Referring now to FIG. 8, the disk 105 includes identical first and second disk halves 120 and 125. Each of these disk halves 120 and 125 include a outer wall portion 130 and 135 having a plurality of substantially semi-circular precuts 140 and 145 around its perimeter. These semi-circular precuts 140 and 145 are aligning to form a plurality of substantially circular precut apertures 150 sized to accommodate a grommet 155. These disk halves 120 and 125 are affixed together by any conventional adhesive material (e.g., glue) or process (e.g., sonic welding). It is contemplated, however, that the circular disk 105 may alternatively include a first circular disk portion and a second circular disk portion, identical to the first circular portion but including an entire outer wall portion having the generally circular apertures.

Referring to FIGS. 9 and 10, a grommet 155 substantially similar to those grommets of FIGS. 3 and 4 is illustrated. The grommet 155, made of plastic and being a circular "button" shape, includes a bore 160 along its central axis having an inner and outer ends 165 and 170, respectively. A thin wall or membrane 175 is positioned to intersect the bore 160 in which the membrane 175 is pierced with a small hole or perforation 180. As shown, the membrane 175 is placed proximate to the inner end 165 of the bore 160, but may be placed anywhere along the bore 160. Since the membrane 175 has an elastic nature, the perforation 180 is expandable to permit a flora stem or branch 185 to be inserted therethrough and securely gripped so that no nutrient fluid leaks out of the reservoir 110. It is contemplated, however, that the grommet 155 may be removed from the aperture or permanently positioned therewith.

The compartment 110 is filled with nutrient fluids by removing its associated grommet 155 from its corresponding aperture and inserting such nutrient fluid therethrough. The grommet 155 may include a pull-tab (not shown) to facilitate its removal without tearing the grommet 155.

Referring now to FIGS. 11–14, another embodiment of the present invention is illustrated for preferably displaying dried flora, although all of the embodiments of the present invention are functional with both dried flora and flora requiring nutrient fluids. As shown in FIG. 11, one embodiment of a floral stand for dried flora is configured in a disk-shaped shell 200 which is attachable to a glass window or wall 202. The shell 200 is attached by any conventional attachment mechanism 205 including suction cups, hangers, Velcro, adhesive tape and the like. Flora stems and branches 210 are held radially around the circumference of the shell 200 with some of the stems and branches extending downwards.

As illustrated in FIG. 12, the shell 200, made of polystyrene plastic or any similar durable material, is circular in construction but it may be constructed according to a variety of shapes and sizes (e.g., a heart for Valentine's day, an item associated with a holiday, etc.). The shell 200 is horizontally cut and affixed together to form a shell enclosure. For the configuration shown in FIG. 12, the shell comprises two identical circular faces; namely, a first and second faces 215 and 220. Preferably, although not required, the shell 200 further includes a circumferential edge portion 225 having a plurality of precut apertures 230 appropriate in size to accommodate the flora stems or branches 210.

Figure 14:
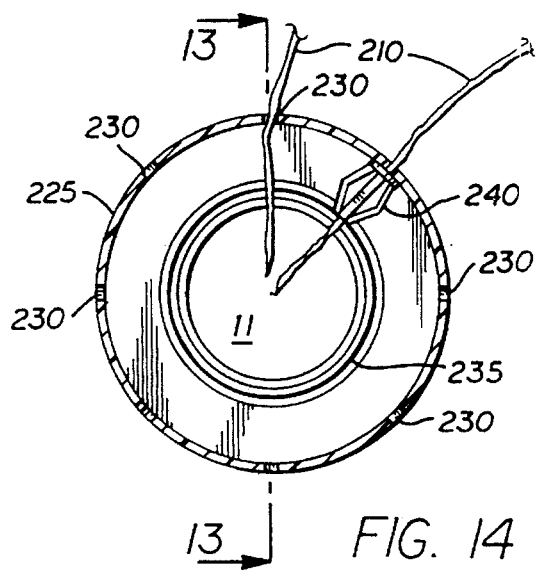
FIG. 14 is a cutaway plan view of the second embodiment taken along lines 14—14 of FIG. 12.

Referring now to FIGS. 13 and 14, a pair of spring clips 235, preferably made of polystyrene plastic, outlining the shape of first and second faces 215 and 220 are coupled to these faces 215 and 220 by any conventional adhesive technique including, but not limited to, gluing, taping, sonic welding injection molding and the like. The spring clips 235, which directly oppose one another, have a width such that both spring clips 235 occupy a depth of the shell 200. One or more flower stems in a plurality of angular orientations relative to apertures 230 can be secured between the opposing spring clips 235. It is contemplated, however, that a single spring clip could be coupled to one of the faces (e.g., the first face 215), provided that its width is approximate to the depth of the shell 200. As a result, the flora stem or branch 210 is secured on one side by the spring clip and on the other side by the second face 220. It is further contemplated that the spring clip(s) 235 may be oriented perpendicular to the first and/or second faces, or inwardly angled at an angle 90° or less (i.e., angled toward a center of the first and/or second face 215 and 220) as shown in FIG. 14.

To provide supplemental gripping power as shown in FIG. 14, at least one pincer device 240, located between the edge portion 225 and the spring clip 235 is affixed to the shell 200 in line with the aperture 230. The pincer 240 secures the flora stem 210 in two places along its length.

Figure 15:
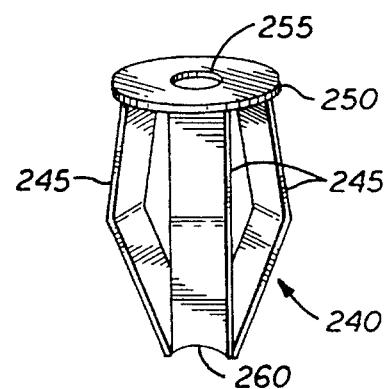
FIGS. 15 and 15a are perspective views of two different types of pincer devices which may be used to provide supplemental gripping to a flora stem.
Figure 15A:
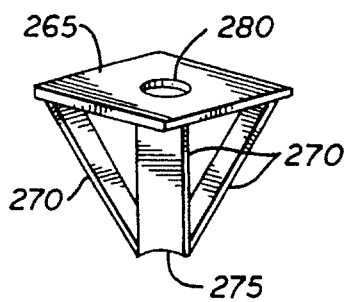

Referring now to FIGS. 15 and 15a, there are shown two different configurations of pincers which may be used inside the shells of the flower stands to grasp flower stems or branches. In FIG. 15, the pincer has three or more curved legs 245 which are separately glued to a circular top piece 250 at one end, and come together at their other ends. A first hole 255 is cut in the center of the top piece 250, and a second hole 260 is formed at the bottom by the pincer legs 245 coming together. The stem 210 is inserted through the first hole 255 and through the second hole 260. Each curved leg 245 is stiff enough to maintain a grip on the flora stem 210 at its bottom 260 as desired.

As shown in FIG. 15a, the alternate pincer design comprises a rectangular or square shaped top piece 265, and four pincer legs 270. The pincer legs 250 are each separately affixed to one end to the outer edges of the top piece 265 and come together at the bottom, forming a first hole 275. A second hole 280 is cut in the center of the top piece 265 and sized for insertion of the flora stem 210. In this pincer configuration, the pincer legs 270 are straight instead of being curved. However, they are also stiff enough to maintain a grip on the flora stem 210 at their bottom end 275 where they come together in a clamp.

Both the pincer configurations are typically made of polystyrene plastic or equivalent material sheet. They may however, alternatively be formed in one piece instead of being composed of several pieces affixed, depending on the economics of manufacture.

Figure 16:
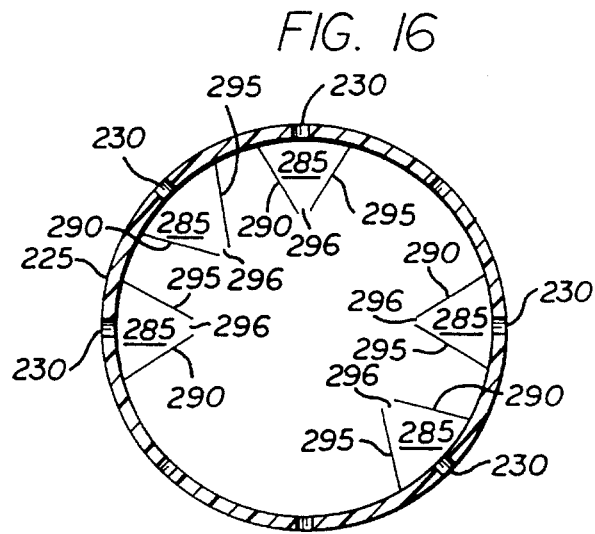
FIG. 16 is a cutaway pan elevation view of the second embodiment having spring clips oriented in a V-shape.

However, unlike the angular spring clip orientation shown in FIGS. 13 and 14, the spring clips 285 may include a plurality of clip portions 290 and 295 being V-shaped in construction as shown in FIG. 16. These V-shaped spring clip portions 290 and 295 includes a gap 296 near a vertex-like portion of the V-shaped spring clip 285 to secure the flora stems or branches inserted therethrough.

Referring now to FIG. 17, another embodiment of the multiple orientation floral stand is illustrated. The floral stand comprises a double-sided outer shell 300 including a first, second and third shell members 305, 310 and 315, respectively. The first shell member 305 includes a first circular face 320 coupled to a circumferential edge portion 325 having a plurality of precut apertures 330 in a staggered orientation in order to produce foreground apertures 330a and background apertures 330b. The foreground apertures 330a are preferably equidistant from each other. The same is true for the background apertures 330b, however it is contemplated that these apertures 330a and 330b could be arbitrarily spaced or even aligned along a single plane. In order to create an aesthetically pleasing display, flora stems or branches 335, preferably those not requiring liquid nutrients (e.g., dried flowers, plastic flowers, etc.), are inserted through the foreground and background apertures 330a and 330b, respectively.

Referring to FIG. 18, the second shell member 340 includes a second circular face 345 having a diameter less than the diameter of the circumferential edge portion 325 and a spring clip 350 coupled to the second circular face 345 by any conventional adhesive technique including, but not limited to, gluing, taping, sonic welding, and the like. The spring clip 350 is a thin, flexible material that receives the flora stem or branch 335 and secures it within the shell 300. The second shell member 340 is inserted spring clip first through the circumferential edge portion 325 to loosely rest against the first circular face 320. As a result, flora stems or branches 335 inserted through the foreground apertures 330a are secured by on one side by the spring clip 350 and the first circular face 320 on the other side. It is contemplated, however, that a plurality of stoppers may be implemented around an interior surface of the circumferential edge portion to prevent the second shell member 345 from being wedged against the first circular face 320 so that flora stems or branches cannot be inserted.

Still referring to FIG. 18, the third shell member 315, including a third circular face 355 and a spring clip 360, is identical to the second shell member 340, except that a third circular face 355 has a diameter approximately equal to a diameter of the circumferential edge portion 325. Thus, the flora stems or branches 335 inserted through the background apertures 325b are secured on one side by the spring clip 360 and the second circular face 345 on the other side as shown in FIG. 19.

Referring now to FIG. 20, a cross-sectional view of the floral stand along line 20—20 is illustrated. In this embodiment, the floral stem or branch 335 is inserted through a foreground aperture 325a secured by the spring clip 350 and the first circular face 320. Upon insertion of the flora stem or branch 335, the spring clip 345 is bent in the direction of the path of the flora stem or branch 335 so that insertion is easy and the flora stem or branch 335 is securely fastened as previously illustrated in FIG. 19.

While the present invention has been described in terms of a preferred embodiment, other embodiments may come to mind to those skilled in the art without departing from the spirit and scope of the present invention. The invention should, therefore, be measured in terms of the claims which follow.

What is claimed is:

1. A multiple orientation floral stand for displaying flora, said multiple orientation floral stand comprising:

a hollow shell configured to receive at least a first and second stem of said flora; and means for securing said plurality of stems of said flora to remain within said shell, said securing means, located within said shell, includes at least one non-linear spring clip coupled to said shell, said at least one spring clip, made of a flexible material, is adapted to hold both said first stem and said second stem at a predetermined angle to each other by applying both a lateral and longitudinal gripping force against said first and second stems inserted into said shell at a plane of contact extending co-planar to said first and second stems.

2. The multiple orientation floral stand according to claim 1, wherein said shell includes a first and second faces coupled together forming a predetermined depth, wherein said plurality of stems are inserted between the first and second faces.

3. A multiple orientation floral stand for receiving and displaying a plurality of stems of flora, said multiple orientation floral stand comprising:

a hollow shell including a first and second faces coupled together by a circumferential edge portion including a plurality of precut apertures, each precut aperture is sized to accommodate at least one of said plurality of stems, wherein said plurality of stems are inserted between said first and second faces and through said precut apertures; and means for securing said plurality of stems of said flora, said securing means, located within said shell, includes at least one spring clip coupled to said shell, said at least one spring clip, being made of a flexible material, is configured to hold both a first stem of said plurality of stems and a second stem of said plurality of stems at a predetermined angle from said first stem.

4. The multiple orientation floral stand according to claim 2, wherein said securing means includes a first and second spring clips coupled to said first and second faces respectively, said first and second spring clips, having a combined width approximately equal to said predetermined width, directly oppose one another such that said plurality of stems is secured by being between said first and second spring clips.

5. The multiple orientation floral stand according to claim 4, wherein said first and second spring clips are oriented so as to traverse perpendicularly and substantially outline said first and second faces, respectively.

6. The multiple orientation floral stand according to claim 5, wherein said first and second spring clips are inwardly angled so that an angle created by said spring clip and a surface of the first and second faces responding in ninety degrees or less.

7. The multiple orientation floral stand according to claim 1, wherein said at least one spring clip is an element capable of retaining said plurality of stems in said plurality of orientations.

8. The multiple orientation floral stand according to claim 7, wherein said at least one spring clip has a shape which outlines a circumference of said shell.

9. The multiple orientation floral stand according to claim 5, wherein said first and second spring clips are made of plastic.

10. A multiple orientation floral stand comprising:

a hollow shell including a pair of faces coupled together to form a predetermined depth between said pair of faces; and a spring clip configured to secure a plurality of stems of flora inserted between said pair of faces of said shell, said spring clip, made of a thin, flexible plastic material extending a substantial distance from a second of said pair of faces, is directly coupled to a first of said pair of faces, to grip a portion of said each of said plurality of stems inserted between said pair of faces of said shell between said spring clip and said second of said pair of faces and to maintain said each of said plurality of stems in a selected orientation.

11. The multiple orientation floral stand according to claim 10, further comprises means for affixing said shell to a generally flat surface.

12. A multiple orientation floral stand for displaying flora in a plurality of orientations, comprising:

a hollow shell including a first and second faces, said shell is shaped in any pleasing configuration; and means for securing a plurality of stems of said flora inserted within said shell, said securing means includes a first spring clip coupled directly to one of said first and second faces and extending a substantial distance from the other of said first and second faces of said shell, said first spring clip, being made of a thin, flexible material, configured to simultaneously grip a portion of each of said plurality of stems inserted within the shell and to maintain each of said plurality of stems in one of said plurality of orientations.

13. The multiple orientation floral stand according to claim 12, wherein said securing means further includes a second spring clip coupled to one of said first and second faces and directly opposite said first spring clip, wherein said first and second spring clips allow said plurality of stems to be inserted between and secured by said first and second spring clips.

14. The multiple orientation floral stand according to claim 13, wherein said at least one spring clip is made of polystyrene plastic.

15. The multiple orientation floral stand according to claim 10, wherein said at least one spring clip is made of polystyrene plastic.

* * * * *